United States Patent [19]

Shimizu et al.

[11] Patent Number: 5,199,803
[45] Date of Patent: Apr. 6, 1993

[54] METHOD OF COMPRESSING AND EXPANDING DOT-MATRIX CHARACTER

[75] Inventors: Tadao Shimizu; Toshikazu Itoh, both of Tokyo, Japan

[73] Assignee: Oki Electric Industry Co., Ltd., Tokyo, Japan

[21] Appl. No.: 667,381
[22] PCT Filed: Sep. 22, 1989
[86] PCT No.: PCT/JP89/00965
§ 371 Date: Mar. 21, 1991
§ 102(e) Date: Mar. 21, 1991
[87] PCT Pub. No.: WO90/03272
PCT Pub. Date: Apr. 5, 1990

[30] Foreign Application Priority Data

Sep. 26, 1988 [JP] Japan .................. 63-238780

[51] Int. Cl.⁵ .......................... B41J 2/485
[52] U.S. Cl. .................. 400/121; 395/108; 395/110; 340/790
[58] Field of Search ............ 400/61, 70, 121; 340/735, 790; 395/110, 114, 108, 150, 151

[56] References Cited

U.S. PATENT DOCUMENTS 4,632,579 12/1986 Takano et al. .............. 400/121
4,704,040 11/1987 Takano et al. .............. 400/121
4,942,390 7/1990 Do et al. .................... 400/121

FOREIGN PATENT DOCUMENTS 56081 7/1982 European Pat. Off. ......... 400/121
47676 3/1982 Japan ........................... 400/121
49572 3/1982 Japan ........................... 400/121
30052 2/1987 Japan ........................... 400/121
103154 5/1987 Japan ........................... 400/121
62-103154 5/1987 Japan.

OTHER PUBLICATIONS

"Compression/Decompression of Font Patterns"; Anon.; *IBM TDB*; vol. 28, No. 8, pp. 3563-4, Jan. 1986.

*Primary Examiner*—David A. Wiecking
*Attorney, Agent, or Firm*—Wenderoth, Lind & Ponack

[57] ABSTRACT

A character compression-decompression method for printers in which dots are added before compression of a character so as to generate a character in which the same dot pattern continues. The character is compressed and then is stored in a character geernator. Upon printing the character, the compressed character is read from the character generator and is then expanded so as to return the compressed character to the character before compression. The dots added when the character was compressed are removed from the expanded character. Thus, a character which cannot be compressed because the same pattern does not continue therein can be compressed by a simple compression method, and a large number of dot matrix characters can be stored in the character generator.

3 Claims, 5 Drawing Sheets

METHOD OF COMPRESSING AND EXPANDING DOT-MATRIX CHARACTER

BACKGROUND OF THE INVENTION

The present invention relates to a method of compressing a dot-matrix character and a method of expanding a compressed character, which are suitable for storing several dot-matrix characters in a character generator.

DESCRIPTION OF THE PRIOR ART

Heretofore, printers have been provided which exhibit a character with several dots (for example, 24 dots in a vertical direction and 24 dots in the horizontal direction). Printer of this kind are called as "dot-printer", and among them, wire dot printers which use wires for printing dots are famous. In general, a printer of this kind incorporates a character generator for storing data therein which determines whether or not a dot is printed (which will be hereinbelow abbreviated as "dot data"), and reads dot data to be printed from this character generator when a character is to be printed; thus, the character can be printed. For example, in the case of a wire-dot printer in which 24 wires are arranged in the vertical direction, one character is printed by reading dots in a vertical row (24 dots) from the character generator several times.

Recently, it has been necessary for printers to print several kinds of characters. Accordingly, a method of storing several characters in the character generator was invented. This invention is disclosed in Japanese Laid-Open Patent Publication No. 60-257253 or U.S. Pat. No. 4,704,040. This invention concerns a character compression method in which the configuration of dots (which is hereinbelow simply denoted as a "dot-pattern") is checked for each column, and in the case of plural repetitions of the same pattern, data corresponding to the dot-pattern in one column and data indicating the number of repetitions thereof are stored in the character generator in order to reduce the volume of data for one character. However, there are characters which cannot be compressed by this method. One of such characters is shown in FIG. 1. As understood from this figure, in one and the same row, no dots are successively present in each two adjacent columns. That is, no dots are successive in the lateral direction. Accordingly, the dot-patterns in each two adjacent columns are always different from each other so that the same patterns are not present in succession. This character has been devised in order to improve the printing quality by a printer and to increase the printing speed. Accordingly, the number of dots in the lateral direction is greater than that of a normally printed character. In the character "M" shown in this figure, the number of dots in the lateral direction is 30. Furthermore, as mentioned above, no dots are successive in the lateral direction. An explanation is provided hereinbelow as to the reason for this.

In the case of a wire-dot printer, when a wire is driven, the wire projects from its initial position so as to print a dot on printing paper at a predetermined position, and then it returns to its initial position. In the case of successively driving the same wire, it is driven after having returned to its initial position. By the way, the configuration of the dot pattern in a normal character is not previously known. Dots are sometimes present successively in the lateral direction. Accordingly, the printing control is arranged so that when a dot is printed by a certain wire, another wire cannot be driven until the certain wire has been returned to its initial position. However, with this control method, wires cannot be efficiently driven so that the printing speed cannot be increased. This is because of the presence of wires which can be driven even though the printer has not returned to its initial position. They are wires which are not driven when dots in the column just before the present column are printed. Accordingly, if the dot-pattern of a character has such a configuration that dots are not successive in the lateral direction, the wires can be effectively driven so as to increase the printing speed. This is the reason for the abovementioned matter.

SUMMARY OF THE INVENTION

Accordingly, an object of the present invention is to provide a method of simply compressing a character which cannot be compressed because the same dot pattern does not continue, and a method of expanding the thus compressed character.

According to the present invention, before a character is compressed, dots are added so as to generate a character in which the same dot-pattern continues. Furthermore, the thus generated character is compressed and stored in a character generator. Upon printing the character, the compressed character is read out from the character generator and decompressed and then returned to the character before the compression. Furthermore, the dots added when the character was compressed are removed from the thus expanded character.

In this manner, even a character which cannot be compressed since the same dot pattern does not continue can be simply compressed.

DESCRIPTION OF THE PREFERRED EMBODIMENT

A compression method is explained at first as follows.

Figure 1:
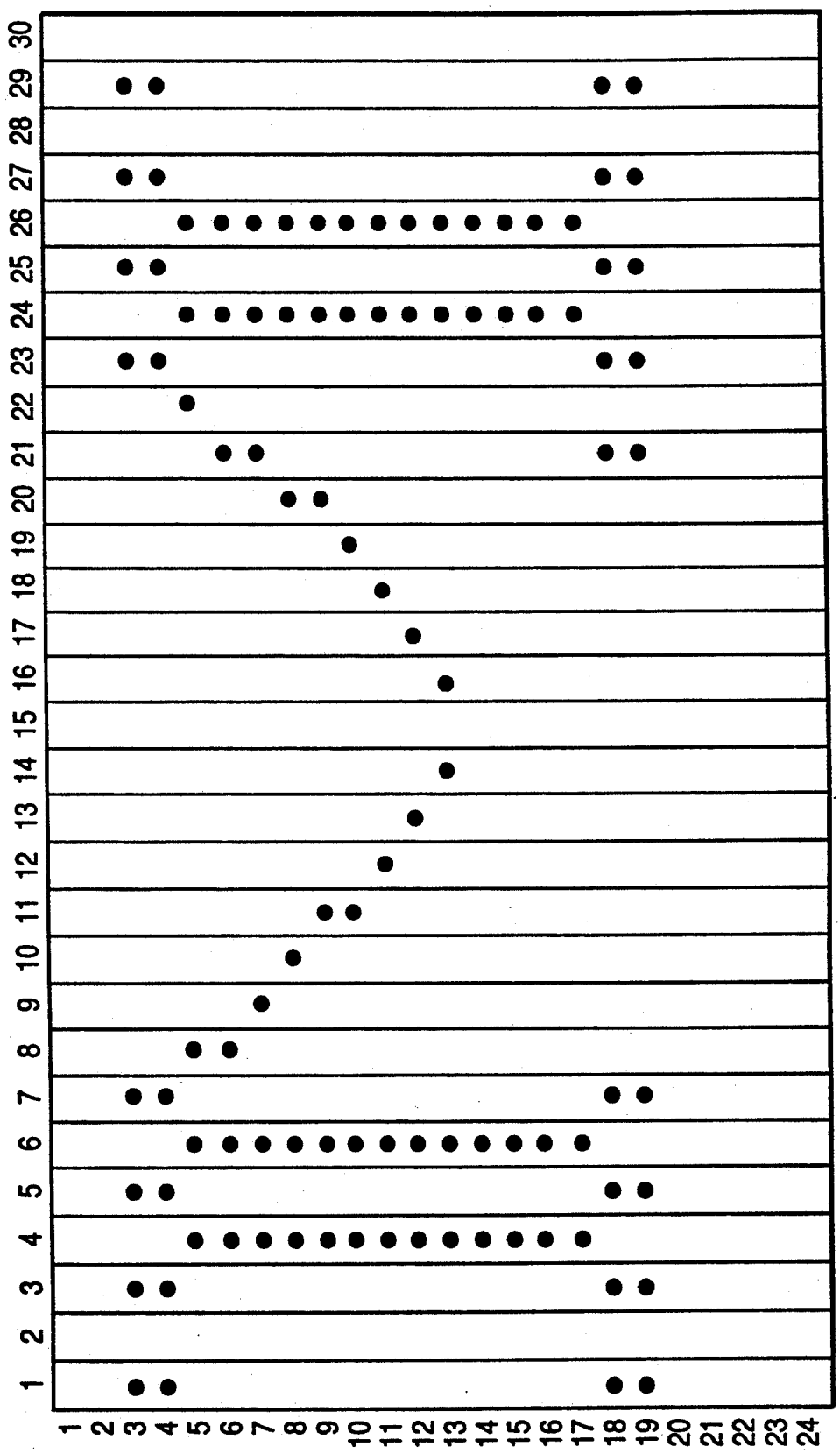
FIG. 1 is a view illustrating an example of characters in which the same dot-pattern is not present in succession.
Figure 2:
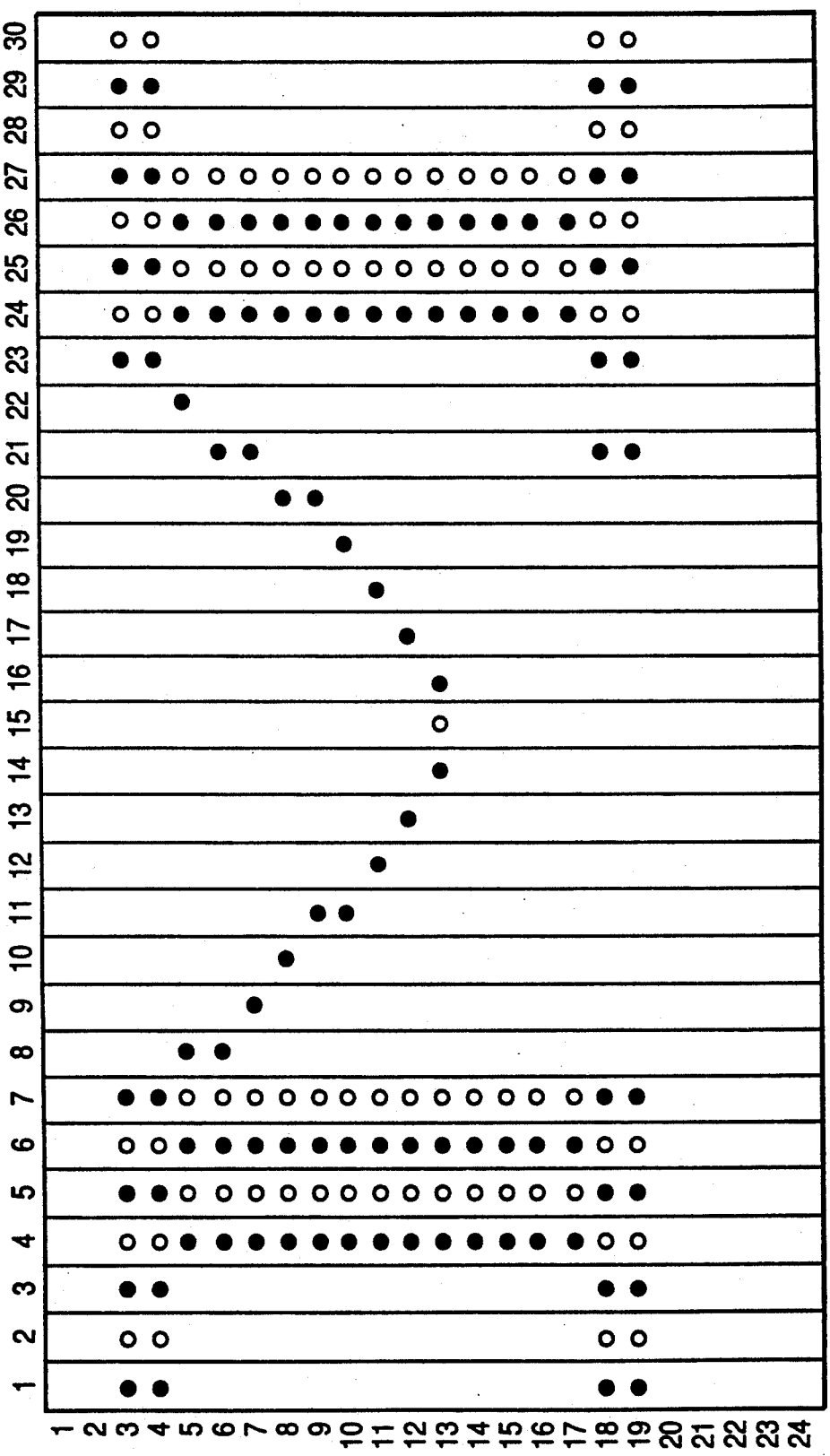
FIG. 2 is a view illustrating a character in which dots are added so that the same dot pattern is present in succession.

FIG. 2 shows a character in which dots "o" are added to a character "M". These dots "o" are merely added in order to make the same dot pattern successive, and are removed before printing. Such a dot "o" is added if a dot "●" is present in the same row and in the column just before the present row. However, if the same pattern is not present in succession even though dots are added, these dots are not added. In the case of the character "M", if dots "o" are added in the second column, 4th to 7th columns, 15th column, 24th to 28th columns and 30th column, the same patterns are successive. Accordingly, the dots "o" are added in these columns. However, since the same pattern is not obtained in each adjacent rows even though dots "○" are added in the 8th to 14th columns and 17th to 23th rows. Accordingly, no dots are added in these columns.

An explanation follows of how stored memory is obtained in the character generator in the case of compressing the character shown in FIG. 2 using the above-mentioned method. It is noted here that the character generator can store therein 8 bit data at one address.

Figure 3:
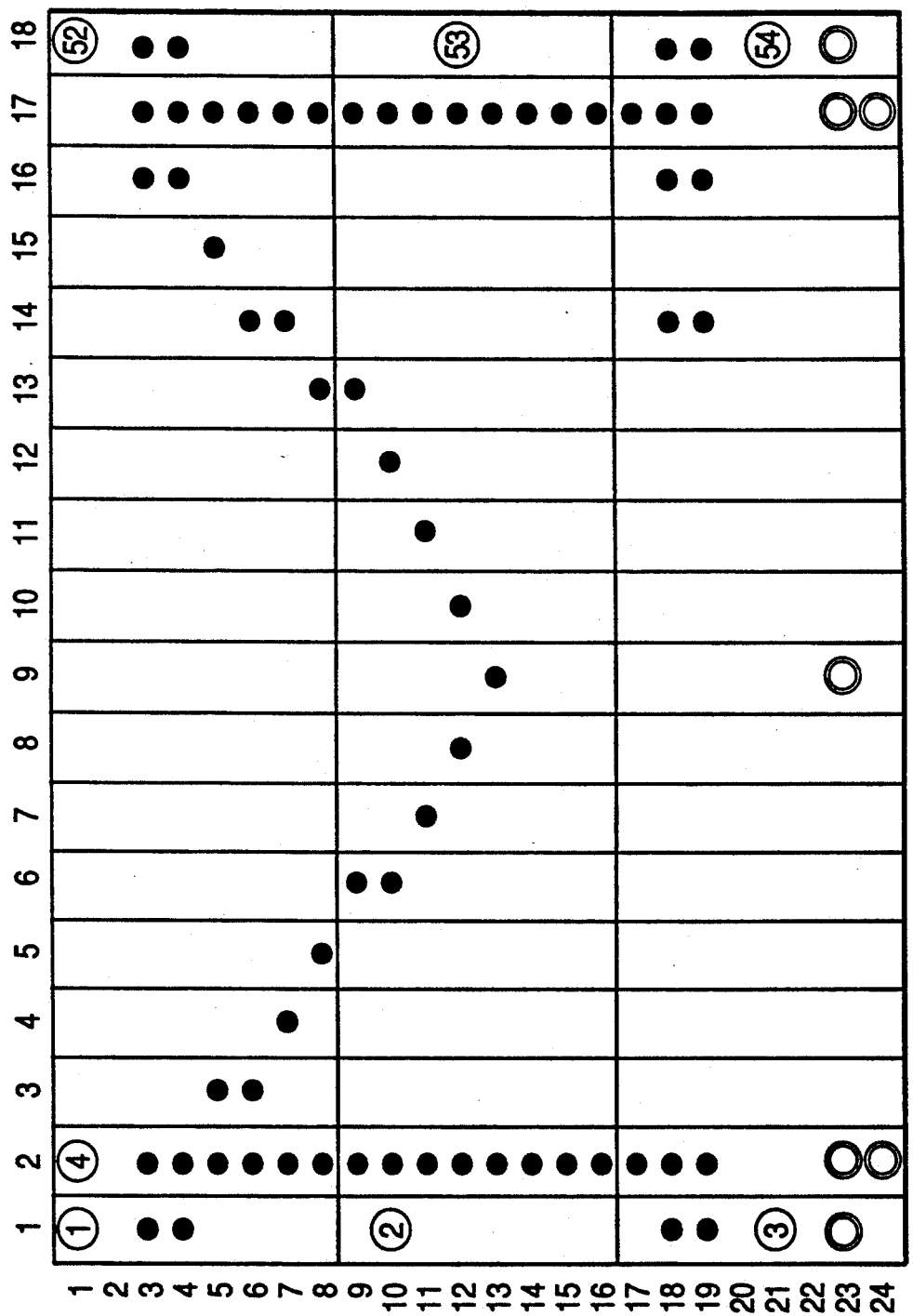
FIG. 3 is a view illustrating stored data in a character generator.

FIG. 3 shows stored data in the character generator. However, the stored data is shown in a matrix in order to enable a result of printing to be easily imagined. In this figure, numerals 1 to 18 shown at the topmost of the figure denote column numbers while numerals 1 to 24 at the leftmost of the figure denoting the number of rows, and numerals ①, ②, ③, ④, ... ㊿, ㊾, ㊿ in the leftmost of the figure denote addresses in the character generator. Data in the first to 8th rows in the first column are stored at address (1) while data in the 9th to 16th rows and in the first column are stored at address (2), and data in the 17th to 24th rows and the first column is stored at address (3). Furthermore, data in the first to 8th rows and in the second column is stored at address (4).

Data stored in the character generator consists of dot data and data indicating a number of repetitions. The dot data is given by that in the first to 19th rows of each column as shown in FIG. 3 in which the dot data is exhibited by "●" and spaces. "●" indicates the printing of a dot in that location while a space indicates no printing of a dot in that location. In the character generator, binary data, that is, a "1" corresponding to "●" and a "0" corresponding to the space, is stored. For example, data stored at address (1) in the character generator is binary 8 bits [00110000] (dot data in the first to 8th rows and in the first column). Similarly, data stored at address (4) is binary 8 bits [00111111] (dot data in the first to 8th rows and in the second column). Meanwhile, data indicating the number of repetitions is data in 20th to 24th rows and in each column as shown in FIG. 3. In the character generator, binary data, that is, a "1" corresponding to "◎" and a "0" corresponding to a space, is stored. Data indicating the number of repetitions is given by 5 binary bits having the topmost bit exhibiting data in 20th row. For example, the data indicating the number of repetitions in the first row shown in FIG. 3 is [00010], that is, "2" in digital units. similarly, data in the second column is [00011], that is, "3" in digital units.

An explanation follows of a method of expanding a compressed character.

Figure 4:
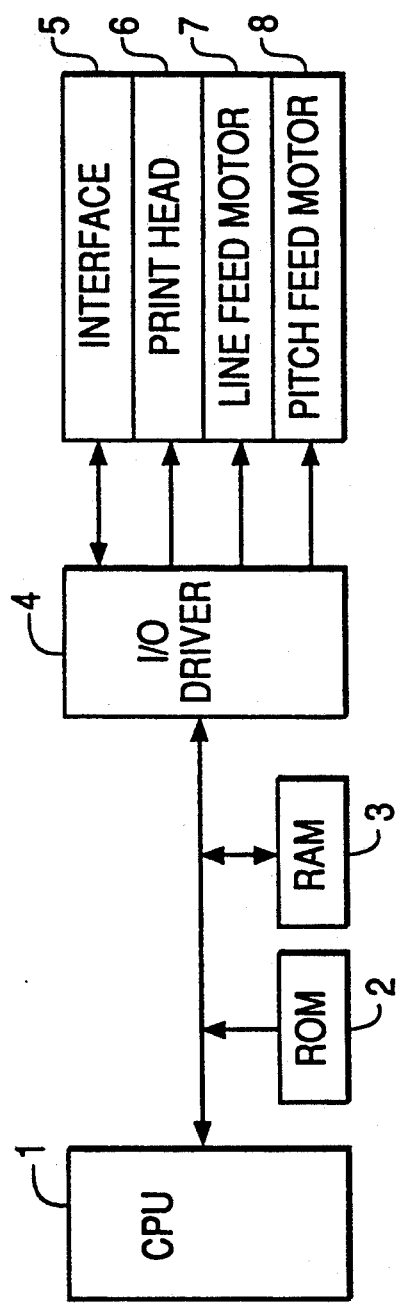
FIG. 4 is a view illustrating a control circuit in a printer.

FIG. 4 shows a control circuit in the printer. In this figure, there are shown a CPU 1 for controlling the printer in its entirety, a ROM 2 which stores therein a program executed by the CPU 1, a RAM 3 for storing data, an I/O driver 4, an interface circuit 5 for connecting an external device to the printer, a print head 6, a line feed motor 7 for feeding printing paper, and a spacing motor 8 for feeding the print head in a horizontal direction. It is noted the character generator which is not shown in this figure, is disposed in the ROM 2 or the RAM 3.

Figure 5:
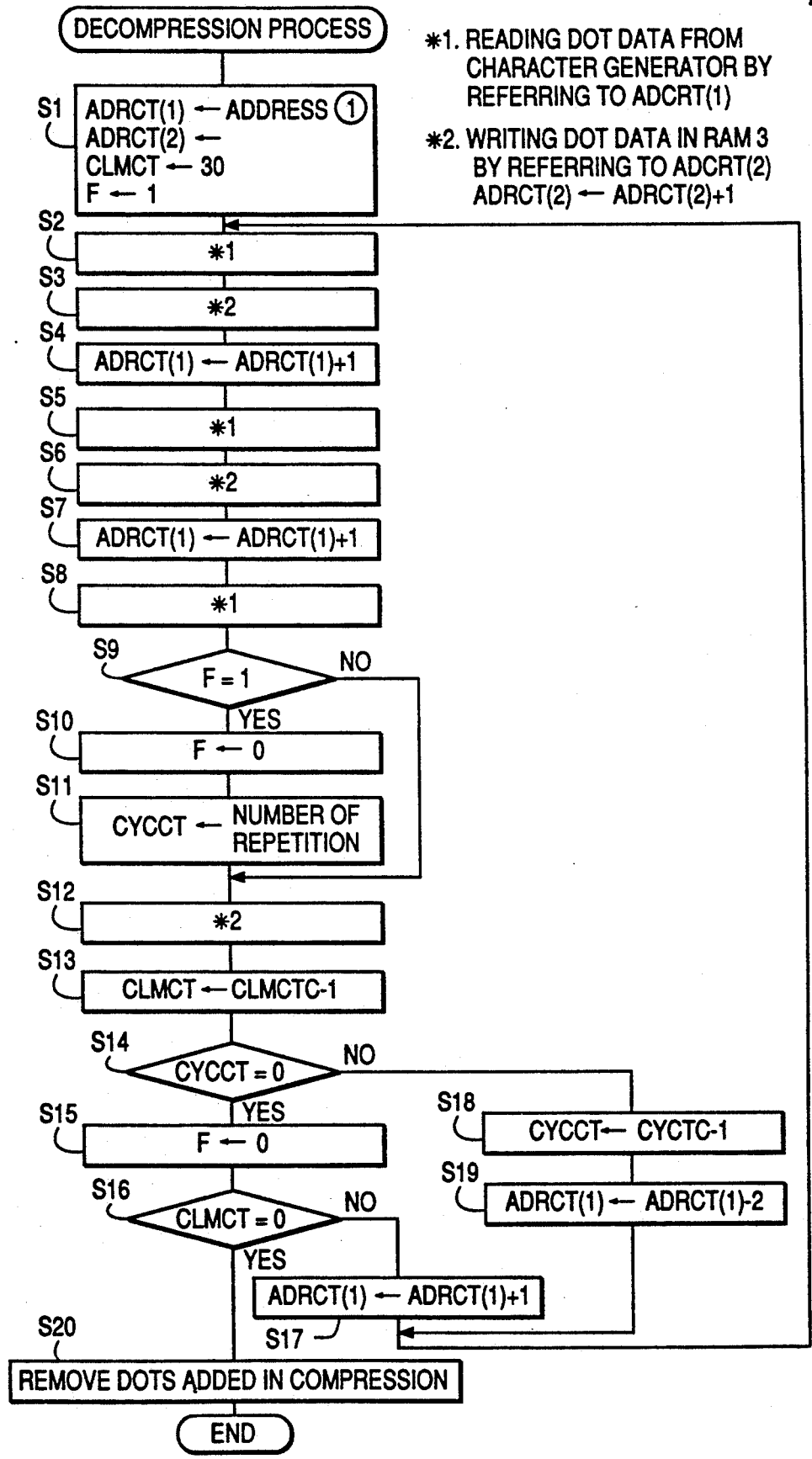
FIG. 5 is a flow-chart explaining an expanding process.

FIG. 5 shows a flow-chart for expanding a compressed character. The decompression process given by this flow-chart is executed by the CPU 2 along with the program stored in the ROM 2. Explanation will be herein made of the expansion process with reference to this flow-chart. Estimation is made in the following explanation so that several kinds of counters and flags are located in the RAM 3 shown in FIG. 4.

First, at step S1, a predetermined address is set on an address counter ADRCT(1). This address is an address stored in the character generator, which is the top address in an storage area in which dot data of a character to be printed is stored. For example, it is the address (1) shown in FIG. 3. Furthermore, a predetermined address is set on an address counter ADRCT(2). This address is an address in the RAM 3, which is the top address in an storage area in which an expanded dot data is stored. Furthermore, "30" is set on a column counter CLMCT. This column counter CLMCT is used for determining whether or not the process for expanding one character is completed. Since the final column of the character in this case is 30th (refer to FIG. 2), "30" is set. Furthermore, "1" is set on a flag F. This flag F is used for determining whether or not a number of repetitions read from the character generator is set on a repetition counter CYCCT which will be explained later, and accordingly, the number of repetitions is set on the repetition counter CYCCT only when "1" is set.

Then, at step S2, dot data is read from the character generator by referring to the address counter ADRCT(1). If the address (1) shown in FIG. 3 is set on the address counter ADRCT(1), dot data [00110000] in the first to 8th rows of the first column is read. An explanation follows with an estimation that the address (1) shown in FIG. 3 is set on the address counter ADRCT (1).

Next, at step S3, referring to the address counter ADRCT (2), this dot data is written in the RAM 3. Then, the content of the address counter ADRCT (2) is increased.

Next, at step S4, the content of the address counter ADRCT(1) is increased.

Next, at step S5, referring to the address counter ADRCT(1), dot data is read from the character generator. Accordingly, dot data [00000000] in the 9th to 16th rows of the first column is read.

Next, at step S6, referring to the address counter ADRCT(2), the dot data is written in the RAM. Further, the content of the address counter ADRCT (2) is increased.

Next, at step S7, the content of the address counter ADRCT(1) is increased.

Next, at step S8, referring to the address counter ADRCT(1), dot data is read from the character generator. Accordingly, data [01100010] in the 17th to 24th rows of the first column shown in FIG. 3 is read. It is noted here that the lower 5 bits [00010] is data indicating the number of repetitions. In this case, the number of repetitions is two.

Next, at step S9, it is determined whether or not a "1" is set on the flag counter F. Since "1" has been set on the flag counter F at step S1 in this case, the result of the determination is a "YES", and the process is advanced to step S10.

Next, at step S10, "0" is set on the flag F.

Next, at step S11, the number of repetitions which has been read at step S8, is set on the repetition counter CYCCT. Since the number of repetitions is 2 in this case, "2" is set.

Next, at step S12, referring to the address counter, the dot data which has been read at step S8 is written in the RAM 3. It is noted here that writing is made such that the lower 5 bits (data indicating the number of repetitions) are set as [00000]. Accordingly, the dot pattern in the first column shown in FIG. 2 is stored in the RAM 3. Furthermore, the content of the address counter ADRCT(2) is increased.

Next, at step S13, the content of the column counter CLMCT is decreased. Accordingly, the value of the column counter CLMCT becomes "29".

Next, at step S14, it is determined whether or not the value of the repetition counter CYCCT is a "0". Since "2" has been set on the repetition counter CYCCT in this case, the result of the determination is a "NO", and the process is advanced to step S18.

Next, at step S18, the repetition counter CYCCT is decreased. Accordingly, the value of the repetition counter CYCCT becomes "1". Next, step S19, "2" is subtracted from the content of the address counter ADRCT(1). Accordingly, the value of the address counter ADRCT(1) is returned to its original value. That is, it is returned to the value set at step 2 which has been already executed.

Next, the process from step S2 to step S13 are executed again. In this phase, since the value of the address counter(1) is returned to the original value, the dot data in the first column shown in FIG. 3 is again read from the character generator, and is then written in the RAM 3. Accordingly, the dot data in the second column shown in FIG. 2 is stored in the RAM 3. It is noted here that the result of the determination at step S9 is a "NO" in this case, and accordingly, the process from step S10 to S11 is not executed. Therefore, the value of the repetition counter CYCCT is not updated so that it is still "1".

Then, the process from step S13 to S19 is executed. In this phase, since the value of the repetition counter is a "1", the result of the determination at step S14 is a "NO". Accordingly, the value of the column counter CLMCT becomes "28" while the value of the repetition counter is a "0". Furthermore, the value of the address counter ADRCT(1) is again returned to the original value.

Next, the process from step S2 to S12 is executed. At this time, since the value of the address counter ADRCT(1) has been returned to the original value, the dot data in the first column is again read from the character generator, and is then written in the RAM 3. This, the dot data in the third column is stored in the RAM 3. It is noted here that the result of the determination at step S9 is a "NO", and accordingly, the process from the step S10 to S11 is not executed. Accordingly, the value of the repetition counter CYCCT is not undated so that it is still "0".

Then, the process from step S13 to S17 is carried out. At this time, since the value of the repetition counter CYCCT is a "0", the result of the determination at step S14 is a "YES". Accordingly, the process of the step S15 is carried out so as to set "1" again on the flag F. If CLMCT=0 at step S16, the process proceeds to step S20 where the dots added during compression are removed. However, since the value of the column counter CLMCT is "27", the result of determination at step S16 is a "NO". Accordingly, the process at step S17 is executed so as to increase the value of the address counter ADRCT(1).

Next, the process from step S2 to step S12 is again executed. In this phase, since the value of the address counter ADRCT(1) has been updated, the dot data in the second column shown in FIG. 3 is read from the character generator at this time, and is written in the RAM 3. Thus, dot data in the 4th column shown in FIG. 2 is written in the RAM 3. It is noted that the result of the determination at step S9 is a "YES", the process from step S10 to S11 is executed. Accordingly, "0" is set on the flag F while "3" being set on the repetition counter CYCCT. The reason why "3" is set on the repetition counter CYCCT is that the number of repetitions of the second column is three, as shown in FIG. 3.

The above-mentioned steps are carried out until the value of the column counter CLMCT becomes "0". When the value of the column counter becomes "0", the result of the determination at step S16 is a "YES", the expansion process for one character is completed. As a result, the dot data shown in FIG. 2 is stored in the RAM 3.

Figure 6:
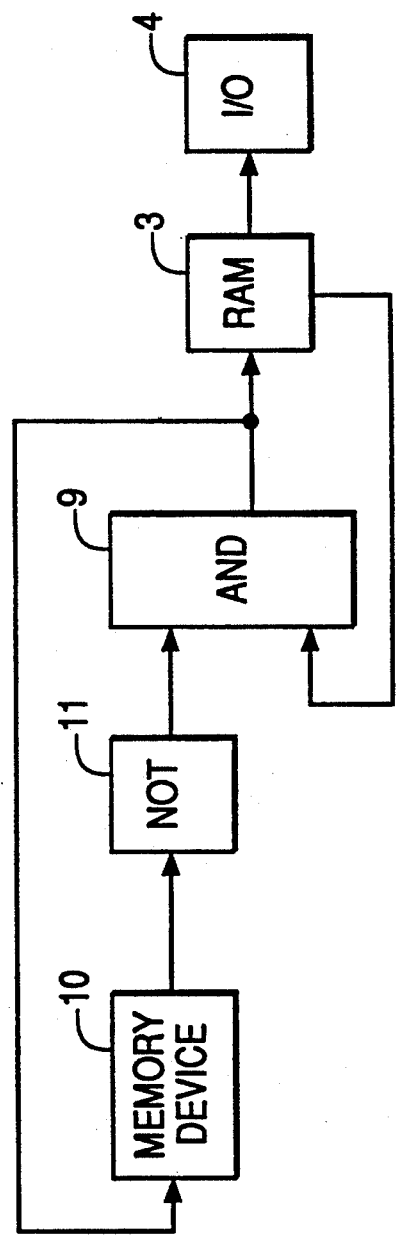
FIG. 6 is a view illustrating a control circuit for removing added dots.

FIG. 6 shows a control circuit for executing the above-mentioned process. It is noted that this process may be carried out by the CPU 1 shown in FIG. 4 along a program stored in the ROM 2. In FIG. 6, there are shown an AND circuit 9, a memory device 10 for storing therein output data from the AND circuit 9, and a NOT circuit 11 for inverting the output data in the memory device 10.

Next, an explanation follows of the operation of this control circuit. Estimation is made such that the content stored in the memory device 10 has been previously cleared so as to be set to "0", and that the dot data which has been expanded as shown in FIG. 2 is stored in the RAM shown in FIG. 4.

First, the dot data (24) in the first column shown in FIG. 2 is read from the RAM 3, and is then delivered to an input terminal B of the AND circuit 9. If numerals 1 to 24 at the left end of FIG. 3 which give bit numbers, a data word with "1" bits at the 3th, 4th, 18th and 19th positions is delivered to the AND circuit 9. At this time, since all the bits of the output data (24 bits) from the memory device 10 are a "0" as mentioned above, accordingly, all the bits of output data (24 bits) from the NOT circuit 11 are a "1". Accordingly, a data word having all the bits which are a "1" is delivered to an input terminal A of the AND circuit 9. Accordingly, the same data as that delivered to the input terminal B is delivered from the AND circuit 9. That is, the dot data in the first column shown in FIG. 2 is delivered. Furthermore, this output data is stored in the RAM 3 shown in FIG. 3, and is then read from the RAM 3 upon printing so that it is transmitted to the print head 6 by way of the I/O driver 4. It is estimated here that the RAM 3 shown in FIG. 4 incorporates an area in which this output data is stored. For example, an area enough to store data in one print line is prepared. The output data from the AND circuit 9, that is, dot data of the first column shown in FIG. 2 is stored also in the memory device 10. As a result, the data which is obtained by inverting the dot data in the first column shown in FIG. 2 is delivered to the input terminal A of the AND circuit 9. That is, a data word having "0" bits at the 3th, 4th, 18th and 19th positions is delivered to the input terminal A of the AND circuit 9.

Then, the dot data (24 bits) of the second column shown in FIG. 2 is read from the RAM 3, and is then delivered to the input terminal B of the AND circuit 9. At this time, the data word having "0" bits at the 3th, 4th, 18th and 19th positions has been delivered to the input terminal A of the AND circuit 9. Accordingly, the dot data "o" in the second column shown in FIG. 2 is removed by the AND circuit 9. Thus, a data word having all bits which are a "0" is delivered from the AND circuit 9. Subsequently, storing of this data in the RAM 3 and storing thereof in the memory device 10 are repeated as mentioned above. Thus, dot data "o" in all columns shown in FIG. 2 is removed. Furthermore, dot data for printing is stored in the RAM 3.

The compression and expansion process has been explained hereinabove, using the character "M" as one example.

However, there are various kinds of dot patterns used in the printer. There is a character such as an alphabetical small character "j", having dot data which exists in the 20th to 24th rows. In this case, data corresponding to a number of repetitions cannot be stored. Accordingly, this character is not compressed. Furthermore, there is a character which is preferably compressed although it has data indicating a number of repetitions which cannot be stored. As to such a character, data (dot data and data concerning the number of repetitions) per column is stored at four addresses in the character generator, that is, the dot data is stored at three address and the data corresponding to the number of repetitions is stored at one address.

As mentioned above, the compression process differs depending upon a character. Accordingly, it is required to identify the compression process. Accordingly, the printer to which the present invention is applied can identify the compression process for every character. The printer therefore has a managing table on which managing information for characters is stored. This managing table is stored in the ROM 2 shown in FIG. 4. Furthermore, data identifying the compression process is stored therein. Further, an address data (top address) which indicates that what address of the dot data of the instant character is stored as a top data in the character generator is stored. Furthermore, in addition, several kinds of data relating to characters are stored.

In view of the foregoing, the present invention is suitable for compressing a character which can not be compressed since the same dot pattern does not continue.

What we claim is:

1. A method of compressing a dot matrix character which is arranged such that dots are not present in two successive adjacent columns of one and the same row, comprising the steps of:
    adding a dot in such a column that the column just before thereof has a dot in the same row so as to obtain a dot matrix character in which dots are successive in two columns and in the same row, in order to generate a dot matrix character in which the same dot pattern is present in plural successive columns;
    storing a dot pattern of a row and a number of repetitions of the dot pattern in a character generator when the same dot pattern continues in successive columns in order to compress and store the dot matrix character.

2. A method of compressing a dot matrix character as set forth in claim 1, wherein no dot is added if a column to be added with a dot has a dot pattern which is not identical with that in a column adjacent thereto even though a dot is added.

3. A method of reading, from a character generator, and expanding a dot matrix character which has been compressed and stored in the character generator by the steps of adding such a column that a dot is present in the column just before thereof so as to generate a dot matrix character in which dots are present in two successive columns of the same row, and storing, in the character generator, the same dot pattern which is present in plural successive columns, corresponding to one column and a number of repetitions of the same dot pattern; comprising the steps of:
    repeatedly reading the same dot pattern, by the number of repetitions stored in the character generator in order to return the compressed matrix character to the character before being compressed; and
    removing a dot from a column where a dot is present in the column just before thereof of the same row so as to remove the dots added when the character was compressed.

* * * * *